US012683372B2

(12) United States Patent
Dozier et al.

(10) Patent No.: US 12,683,372 B2
(45) Date of Patent: Jul. 14, 2026

(54) CABLING DEVICE FOR ELECTRICAL DISTRIBUTION DEVICES

(71) Applicant: Schneider Electric USA, Inc., Andover, MA (US)

(72) Inventors: Steven Wayne Dozier, Murfreesboro, TN (US); Karthik Sundaramoorthy, Murfreesboro, TN (US); Charles Wesley Travis, Jr., Murfreesboro, TN (US); Daniel O'Neill, Smyrna, TN (US)

(73) Assignee: Schneider Electric USA, Inc., Boston, MA (US)

( * ) Notice: Subject to any disclaimer, the term of this patent is extended or adjusted under 35 U.S.C. 154(b) by 280 days.

(21) Appl. No.: 17/920,497

(22) PCT Filed: Jul. 23, 2021

(86) PCT No.: PCT/US2021/043080
§ 371 (c)(1),
(2) Date: Oct. 21, 2022

(87) PCT Pub. No.: WO2022/020784
PCT Pub. Date: Jan. 27, 2022

(65) Prior Publication Data
US 2023/0144867 A1 May 11, 2023

Related U.S. Application Data

(60) Provisional application No. 63/055,927, filed on Jul. 24, 2020.

(51) Int. Cl.
*H02G 5/00* (2006.01)
*H02B 1/01* (2006.01)
(Continued)

(52) U.S. Cl.
CPC ............. *H02G 5/007* (2013.01); *H02B 1/012* (2013.01); *H02B 1/04* (2013.01); *H02B 1/056* (2013.01);
(Continued)

(58) Field of Classification Search
CPC .......... H02B 1/012; H02B 1/04; H02B 1/056; H02B 1/20; H02B 1/26; H02B 1/306;
(Continued)

(56) References Cited

U.S. PATENT DOCUMENTS

| | | | |
|---|---|---|---|
| 10,218,158 B1 * | 2/2019 | Wiant | ................... H02B 1/306 |
| 2007/0091550 A1 * | 4/2007 | Smith | ................. H05K 7/1488 |
| | | | 361/679.02 |
| 2016/0372895 A1 * | 12/2016 | Berger | .................... H02B 1/20 |

FOREIGN PATENT DOCUMENTS

| | | |
|---|---|---|
| CN | 108400533 A | 8/2018 |
| DE | 1769878 U | 7/1958 |
| | (Continued) | |

OTHER PUBLICATIONS

International Search Report and Written Opinion mailed Nov. 4, 2021 in International Application No. PCT/US2021/043083, 11 pages.

(Continued)

*Primary Examiner* — Timothy J. Thompson
*Assistant Examiner* — Rhadames Alonzo Miller
(74) *Attorney, Agent, or Firm* — Patterson + Sheridan, LLP

(57) ABSTRACT

Embodiments provided herein are directed to an improved way to access and increase the area of an electrical distribution device provided for cable pulling and cabling. A rotatable section, on which several electrical components of the electrical distribution device are attached, can be rotated away from the cabling area as a single unit. This permits (Continued)

easier access to the cabling area and increases the size of the cabling area, which results in less time required to pull cables and wire the electrical components of the electrical distribution device.

19 Claims, 3 Drawing Sheets

(51) Int. Cl.

| | | |
|---|---|---|
| *H02B 1/04* | (2006.01) | |
| *H02B 1/056* | (2006.01) | |
| *H02B 1/20* | (2006.01) | |
| *H02B 1/30* | (2006.01) | |
| *H02B 1/32* | (2006.01) | |
| *H02B 1/36* | (2006.01) | |
| *H02B 3/00* | (2006.01) | |
| *H02G 5/06* | (2006.01) | |

(52) U.S. Cl.
CPC ............... *H02B 1/20* (2013.01); *H02B 1/306* (2013.01); *H02B 1/32* (2013.01); *H02B 1/36* (2013.01); *H02B 3/00* (2013.01); *H02G 5/06* (2013.01)

(58) Field of Classification Search
CPC ... H02B 1/32; H02B 1/36; H02B 3/00; H02G 5/007; H02G 5/06
See application file for complete search history.

(56) References Cited

FOREIGN PATENT DOCUMENTS

| | | | |
|---|---|---|---|
| DE | 1039116 B | 9/1958 | |
| DE | 1769878 A1 | 11/1971 | |
| FR | 2590416 A1 * | 5/1987 | ............... H02B 1/21 |

OTHER PUBLICATIONS

Extended European Search Report for European Patent Application EP21847017.7, dated Mar. 11, 2024.

* cited by examiner 124          116     120          180          152     196     116

128          132          168     172,176          196

CABLING DEVICE FOR ELECTRICAL DISTRIBUTION DEVICES

RELATED CASE

The present application claims priority to U.S. provisional patent application Ser. No. 63/055,927, entitled MODULAR SWITCHBOARD, which was filed on Jul. 24, 2020 and is incorporated herein in its entirety.

TECHNICAL FIELD

The present disclosure relates to large electrical distribution devices having a main breaker/fused switch, and more particularly, to providing sufficient space for cabling and wiring the electrical distribution devices after they have been placed in their final location.

BACKGROUND

Typically, when an electrical distribution device is delivered to a job site it is completely assembled and ready to be electrically connected to the utility power source and downstream electrical distribution devices. Most of the components that require electrical connections are located behind the factory installed electrical components of the electrical distribution device, making the required electrical connections very difficult to complete.

SUMMARY

One embodiment described herein provides an improved cabling device for an electrical distribution device. The improved cabling device includes a frame for supporting electrical components of the electrical distribution device. Additionally, the improved cabling device includes a rotatable section on which several of the electrical components of the electrical distribution device are attached, the rotatable section being rotatably attached to the frame for rotation between two positions, in a first position access to a cabling area is restricted and in a second position access to the cabling area provided.

In one embodiment described herein, the electrical components of the electrical distribution device are located in front of the cabling area when the rotatable section is in the first position.

In one embodiment described herein, the electrical components attached to the rotatable section include a main breaker/fused switch, a load bus section and a through bus section.

In one embodiment described herein, the main breaker/fused switch must be electrically disconnected from a line bus section and the through bus section must be electrically disconnected from any adjacent through bus sections prior to rotating the rotatable section from its first position to its second position.

In one embodiment described herein, the main breaker/fused switch, load bus section and through bus section remain electrically connected when the rotatable section is in either of the first or second positions.

In one embodiment described herein, the rotatable section is maintained in each of the first and second positions by a single pivotal latch.

In one embodiment described herein, the rotatable section is attached to a first fixed section by a hinge, the first fixed section defining a hole adjacent to the hinge for receiving one end of the pivotal latch as the rotatable section is being rotated from its first position to its second position.

In one embodiment described herein, the pivotal latch has a notch which receives an edge of the hole defined in the first fixed section when the rotatable section has rotated to its second position, the notch preventing the rotatable section from moving until the pivotal latch has been lifted to disengage the edge of the hole.

Another embodiment described herein provides an improved cabling access device for an electrical distribution device. The cabling access device includes a frame assembly for supporting components of the electrical distribution device including the improved cabling access device. Additionally, the cabling access device includes a line bus section configured to electrically connect to a utility power source and further configured to electrically connect to a power disconnect device such as a circuit breaker or fused switch. The cabling access device further includes a load bus section configured to be electrically connected to the power disconnect device and further configured to be electrically connected to a through bus section. The through bus section provides an electrical connection to a through bus of an adjacent electrical distribution device. The cabling access device also includes a rotatable subframe on which the power disconnect device, load bus and through bus sections are attached. The rotatable subframe is attached to the electrical distribution device frame assembly by a hinge such that when the power disconnect device is electrically disconnected from the line bus section and the through bus section is electrically disconnected from the through bus of an adjacent electrical distribution device the rotatable subframe can be rotated such that a cabling area of the electrical distribution device is exposed permitting improved access for pulling and connecting electrical cables.

In one embodiment described herein, the rotatable subframe includes a first fixed section and a second fixed section, each being temporally attached to the frame during assembly buy double headed rivets received in an L-shaped slots and permanently attached to the frame by screws.

In one embodiment described herein, the frame includes opposed side walls.

Figure 1:
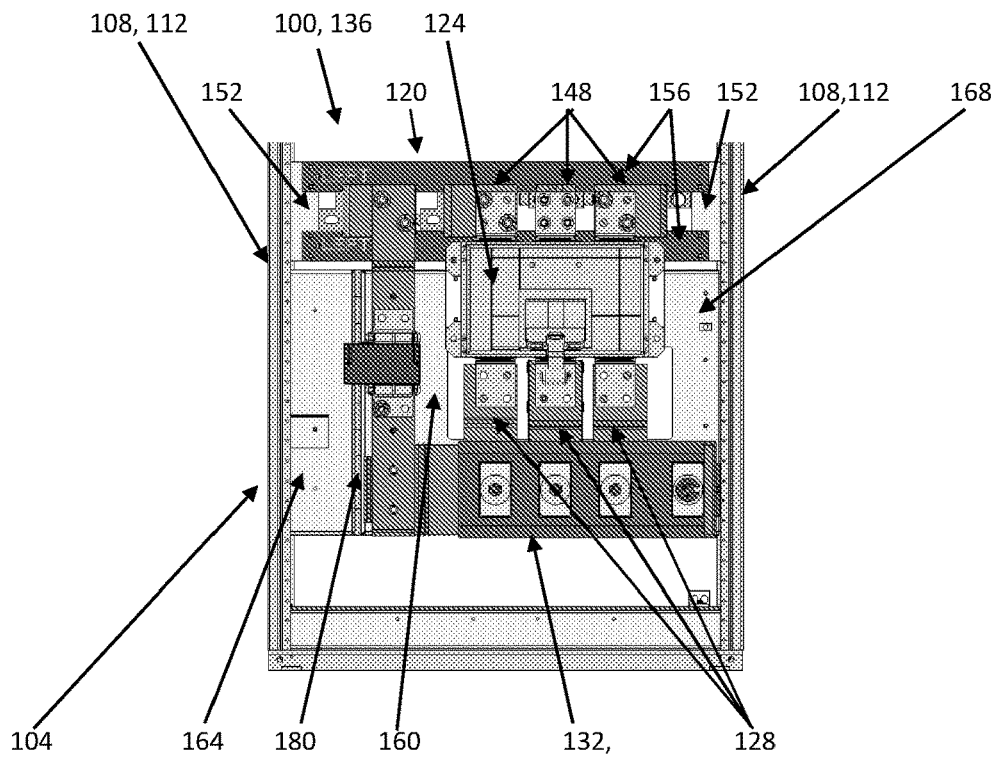
FIG. 1 illustrates a front view of the improved cabling device in its closed position, according to one embodiment described herein.
Figure 2:
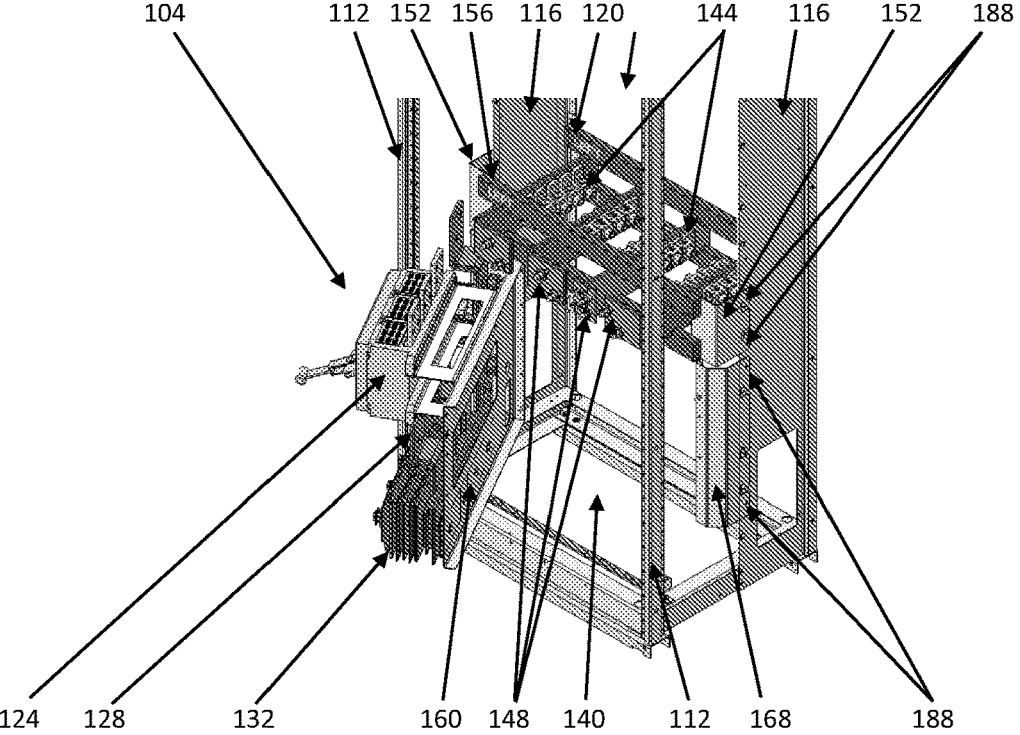
FIG. 2 illustrates an elevated corner view of the improved cabling device in its open position, according to one embodiment described herein.

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Referring now to FIGS. 1-4, an electrical distribution device 100 with an improved cabling device 104 installed is shown. The electrical distribution device 100 includes a frame 108 having uprights 112 and opposed side walls 116, a line bus section 120, a main breaker/fused switch 124, a load bus section 128 and a through bus section 132. When these particular sections are assembled they form a switchboard main section 136.

As shown in the frontal view depicted in FIG. 1, access to a cabling area 140 (FIG. 2) located behind the main breaker/fused switch 124, load bus section 128 and through bus section 132 is restricted. In the cabling area 140 cables (not shown) from the utility supplying power to the switchboard main section 136 are pulled from raceways or conduit in the floor, walls or ceiling and connected to the cable lugs 144 (FIG. 2) attached to line bus busbars 148. The line bus section 120 is securely attached to the opposed side walls 116 by line bus brackets 152 and a line bus subframe 156. The main breaker/fused switch 124, load bus section 128 and through bus section 132 are attached to a rotatable section 160 of improved cabling device 104.

The improved cabling device 104 includes a first fixed section 164 and a second fixed section 168, which can be temporally attached to the opposed side walls 116 by L-shaped slots 172 which receive a double headed rivet 176 and securely attached to the side walls 116 by screws 196. The first fixed section 164 is securely attached to one of the opposed side walls 116 along one side and attached by a hinge 180 to the rotatable section 160 along its other side.

In some applications the hinge 180, or other known mechanisms for permitting rotation of an attached device, could also be attached to a structural member of the frame 108, such as one of the uprights 112 or the side walls 116. The second fixed section 168 is securely attached to the other of the opposed side walls 116.

Figure 3:
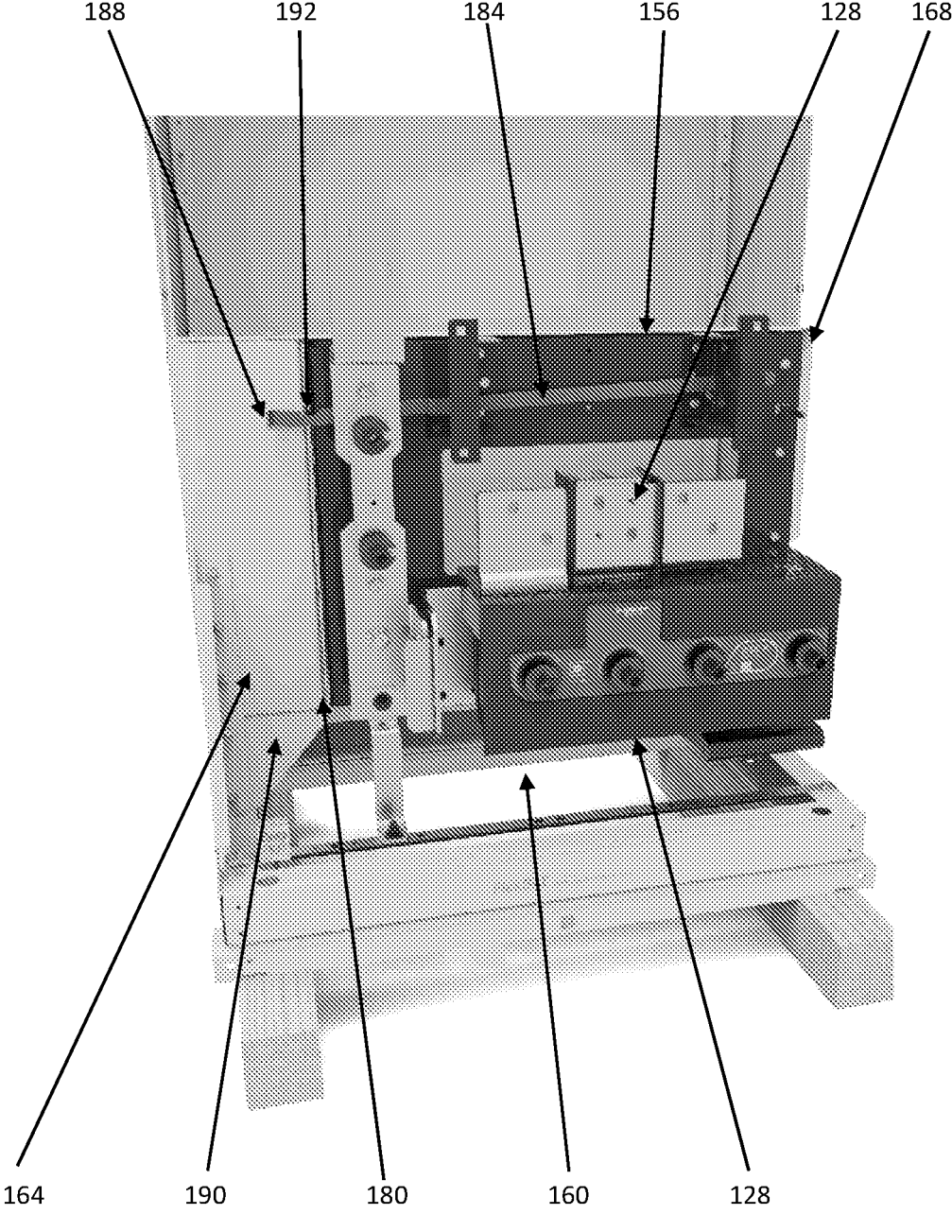
FIG. 3 illustrates an installed improved cabling device with the line bus section and main breaker/fused switch removed, according to one embodiment described herein.
Figure 4:
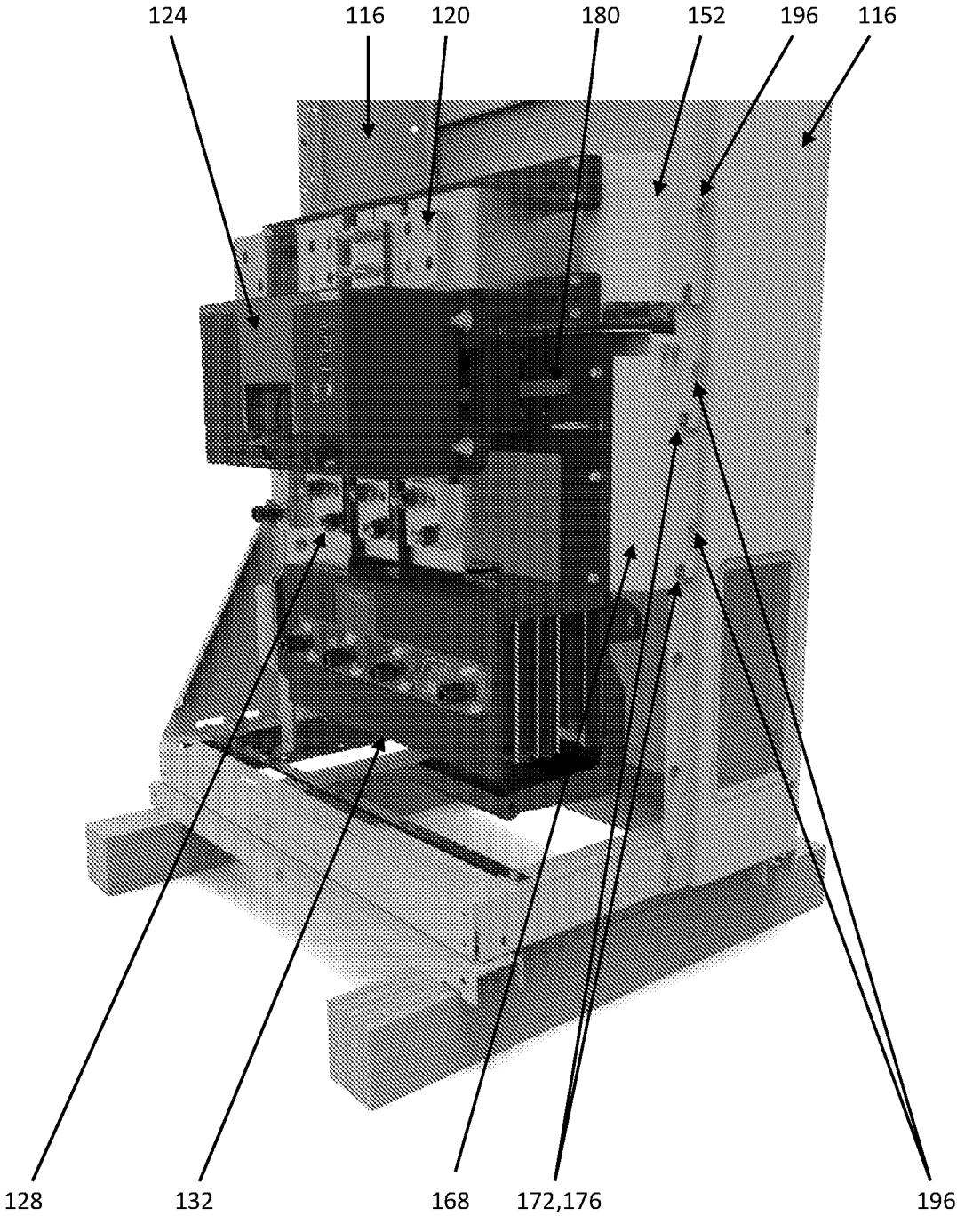
FIG. 4 illustrates an oblique view of the installed improved cabling device, according to one embodiment described herein.

When cabling is required the main breaker/fused switch 124 is electrically disconnected from the line bus busbars 148 and the through bus section 132 is electrically disconnected from any adjacent through bus sections 132. After the main breaker/fused switch 124 through bus section 132 have been disconnected a pivotal latch 184 (FIG. 3) engaging the second fixed section 168 must be released to allow rotation of the rotatable section 160. Additionally, as shown in FIG. 3, the improved cabling device 104 includes a structural support member 190, positioned below the first fixed section 164. Generally, the structural support member 190 provides load bearing support for the rotatable section 160 and, for example, can assist in preventing the rotatable section 160 from sagging during rotation.

When the rotatable section 160 starts rotating the other end of the pivotal latch 184 enters a hole 188 in the first fixed section 164. When the rotatable section 160 has rotated about 90 degrees a notch 192 in the pivotal latch 184 engages an edge of the hole 188 in the first fixed section 164 to keep the rotatable section 160 from moving while cabling is being done.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A cabling access device for an electrical distribution device having a frame for supporting electrical components of the electrical distribution device and a cabling area, the cabling access device comprising:

a rotatable section configured to attach to and support one or more of the electrical components of the electrical distribution device, wherein the one or more of the electrical components includes a first through bus bar mounted on the rotatable section, wherein the rotatable section is further configured to rotatably attach to the frame for rotation between two positions while being attached to and supporting the one or more of the electrical components, wherein in a first position among the two positions access to the cabling area is restricted and the first through bus bar is configured to electrically connect to a second through bus bar of an adjacent electrical distribution device, and in a second position among the two positions access to the cabling area is provided and the first through bus bar is configured to electrically disconnect from the second through bus bar of the adjacent electrical distribution device, wherein the first through bus bar must be electrically disconnected from any adjacent through bus bars prior to rotating the rotatable section from its first position to its second position.

2. The cabling access device of claim 1, wherein the electrical components of the electrical distribution device are located in front of the cabling area when the rotatable section is in the first position.

3. The cabling access device of claim 1, wherein the one or more of the electrical components attached to and supported by the rotatable section further includes a main breaker/fused switch mounted on the rotatable section and a load bus section.

4. The cabling access device of claim 3, wherein the main breaker/fused switch must be electrically disconnected from a line bus section prior to rotating the rotatable section from its first position to its second position.

5. The cabling access device of claim 3, wherein the main breaker/fused switch, load bus section, and first through bus bar remain electrically connected when the rotatable section is in either of the first or second positions.

6. The cabling access device of claim 1, wherein the rotatable section is maintained in each of the first and second positions by a single pivotal latch.

7. The cabling access device of claim 6, wherein the rotatable section is attached to a first fixed section by a hinge, the first fixed section defining a hole adjacent to the hinge for receiving one end of the pivotal latch as the rotatable section is being rotated from its first position to its second position.

8. The cabling access device of claim 7, wherein the pivotal latch has a notch which receives an edge of the hole defined in the first fixed section when the rotatable section has rotated to its second position, the notch preventing the rotatable section from moving until the pivotal latch has been lifted to disengage the edge of the hole.

9. The cabling access device of claim 1, further comprising:

a structural support member coupled to the frame and configured to provide load bearing support for the rotatable section.

10. An electrical distribution device comprising:

a frame assembly configured to support components of the electrical distribution device including a cabling access device;

a line bus section configured to be electrically connected to a utility power source and further configured to be electrically connected to a power disconnect device;

a cabling area available for electrical cables that electrically connect the utility power source to line bus bars of the line bus section;

a load bus section configured to be electrically connected to the power disconnect device and further configured to be electrically connected to a through bus bar, wherein the through bus bar is configured to provide an electrical connection to a through bus of an adjacent electrical distribution device;

a rotatable subframe on which the power disconnect device, load bus section, and through bus bar are mounted, wherein the rotatable subframe is configured to attach to the electrical distribution device frame assembly by a hinge, the rotatable subframe is configured to rotate between two positions while attached to and supporting the power disconnect device, the load bus section, and the through bus bar, when in a first position among the two positions, the power disconnect device is electrically disconnected from the line bus section and the through bus bar is electrically disconnected from the through bus of the adjacent electrical distribution device and the cabling area of the electrical distribution device is exposed for providing the access to the cabling area and for providing access for pulling and connecting the electrical cables; and when in a second position of the two positions, the through bus bar is electrically connected to the through bus of the adjacent electrical distribution device, and the cabling area is behind the through bus bar.

11. The electrical distribution device of claim 10, wherein the rotatable subframe includes a first fixed section and a second fixed section, each being temporarily attached to the frame during assembly by double headed rivets received in an L-shaped slot and permanently attached to the frame by screws.

12. The electrical distribution device of claim 10, wherein the rotatable subframe is capable of being temporarily attached to the frame via opposed side walls of the frame.

13. The cabling access device of claim 1, wherein the cabling area is available for electrical cables that electrically connect the utility power source to line bus bars of the line bus section.

14. The cabling access device of claim 3, wherein the restriction of access to the cabling area is due to two or more of the group comprising the main breaker/fused switch, the load bus section, and the through bus bar.

15. The cabling access device of claim 1, wherein the one or more of the electrical components attached to and supported by the rotatable section further includes a main breaker/fused switch, and wherein the rotatable section is configured to rotate together with the main breaker/fused switch.

16. The cabling access device of claim 1, wherein the one or more of the electrical components attached to and supported by the rotatable section further includes a through bus bar, and wherein the rotatable section is configured to rotate together with the through bus bar.

17. The cabling access device of claim 3, wherein the main breaker/fused switch is physically spaced from the through bus bar.

18. A cabling access device for an electrical distribution device including a main breaker, a load bus bar, a through bus bar and a cabling area, the cabling access device comprising:

a rotatable section on which the main breaker, the through bus bar, and the load bus bar are mounted, the rotatable section being further configured to rotate together with the main breaker, the through bus bar and the load bus bar to provide or restrict access to the cabling area.

19. The cabling access device of claim 18, wherein in a first position to which the rotatable section is configured to rotate, access to the cabling area is restricted, wherein in a second position to which the rotatable section is configured to rotate, access to the cabling area is provided, and wherein the through bus bar is configured to couple to another through bus bar of an adjacent electrical distribution device when the rotatable section is in the first position.

* * * * *